US012458335B2

(12) United States Patent
Jimenez et al.

(10) Patent No.: US 12,458,335 B2
(45) Date of Patent: Nov. 4, 2025

(54) MEDICAL DEVICES FOR USE IN THE CREATION OF A TEMPORARY PNEUMOPERITONEUM

(71) Applicant: Core Access Surgical Technologies, Inc., Atlanta, GA (US)

(72) Inventors: Oscar Jimenez, Key Largo, FL (US); Thomas A. Gordy, Newnan, GA (US)

(*) Notice: Subject to any disclaimer, the term of this patent is extended or adjusted under 35 U.S.C. 154(b) by 818 days.

(21) Appl. No.: 17/741,411

(22) Filed: May 10, 2022

(65) Prior Publication Data
US 2022/0265259 A1   Aug. 25, 2022

Related U.S. Application Data

(63) Continuation of application No. PCT/US2020/065095, filed on Dec. 15, 2020, and a continuation of application No. PCT/US2020/054415, filed on Oct. 6, 2020, and a continuation of application No. 16/837,837, filed on Apr. 1, 2020, now abandoned, which is a continuation-in-part of application No. 16/031,854, filed on Jul. 10, 2018, now Pat. No. 10,722,227, which is a continuation of application No. 15/310,347, filed on Nov. 10, 2016, now abandoned.

(51) Int. Cl.
*A61B 17/02* (2006.01)
*A61B 17/00* (2006.01)

(52) U.S. Cl.
CPC .............. *A61B 17/0281* (2013.01); *A61B 2017/00566* (2013.01)

(58) Field of Classification Search
CPC .......... A61B 17/02–0293; A61B 2017/00566; A61B 2017/306
See application file for complete search history.

(56) References Cited

U.S. PATENT DOCUMENTS

| 2006/0205992 | A1* | 9/2006 | Lubock | A61M 25/10 600/3 |
| 2006/0264710 | A1* | 11/2006 | Spector | A61B 17/0218 600/201 |
| 2008/0058851 | A1* | 3/2008 | Edelstein | A61B 17/3415 606/185 |
| 2010/0081880 | A1* | 4/2010 | Widenhouse | A61B 17/0218 600/206 |

(Continued)

*Primary Examiner* — Nicholas J Plionis
(74) *Attorney, Agent, or Firm* — Miller IP Law; Devin Miller

(57) ABSTRACT

Medical devices include a rigid dome, a viewing window, a vacuum port, a vacuum pressure regulator, an aperture, and a septum. The rigid dome is hemispherical and includes a first dome stage, a second dome stage distal on the first dome stage, and a transition between the first dome stage and the second dome stage. The viewing window is acoustically and\or optically transparent to allow for inspection of the surgical site. The vacuum port allows for a reduction of a pressure on the interior of the rigid dome. The vacuum pressure regulator regulates the pressure on the interior of the rigid dome. The aperture provides access to the interior of the rigid dome and the surgical site. The septum engages with the second dome stage to allow for insertion of a surgical instrument with resistance to loss of the pressure on the interior of the rigid dome.

17 Claims, 4 Drawing Sheets

(56) References Cited

U.S. PATENT DOCUMENTS

2016/0015374 A1* 1/2016 Gifford .............. A61B 17/3439
　　　　　　　　　　　　　　　　　　　　　600/201
2016/0302826 A1* 10/2016 Prati ................. A61B 17/3423

* cited by examiner

MEDICAL DEVICES FOR USE IN THE CREATION OF A TEMPORARY PNEUMOPERITONEUM

CROSS-REFERENCE TO RELATED APPLICATIONS

The present application claims priority to International Patent Application No. PCT/US20/065095 entitled "MEDICAL DEVICES FOR US IN THE CREATION OF A TEMPORARY PNEUMOPERITONEUM", filed on 15 Dec. 2020 and also claims priority to PCT/US20/054415 entitled "MEDICAL DEVICES FOR US IN THE CREATION OF A TEMPORARY PNEUMOPERITONEUM", filed on 6 Oct. 2020. Additionally, the present application claims priority to U.S. Non-Provisional patent application Ser. No. 16/837,837 entitled "MEDICAL DEVICE FOR USE IN THE CREATION OF A TEMPORARY PNEUMOPERITONEUM", filed on 1 Apr. 2020 which is a Continuation-in-Part of U.S. Non-Provisional application Ser. No. 16/031,854 entitled "MEDICAL DEVICE FOR USE IN THE CREATION OF A TEMPORARY PNEUMOPERITONEUM" filed on Jul. 10, 2018, which is a Continuation of U.S. Non-Provisional application Ser. No. 15/310,347 entitled "MEDICAL DEVICE FOR USE IN THE CREATION OF A TEMPORARY PNEUMOPERITONEUM" filed on Nov. 10, 2016, which is a National Stage Entry of PCT/EP2015/000997, filed on May 15, 2015. Each above-referenced application is hereby incorporated by reference for all purposes.

BACKGROUND

A laparoscopic surgical procedure is often preferred to a laparotomy due to shorter recovery times and the reduced adverse impact that it has on the patient's wellbeing. As part of the laparoscopic surgical procedure, a temporary pneumoperitoneum is formed in the patient's abdomen to separate the skin, tissue, and muscle from the organs in the abdominal cavity below. This is achieved by insufflating the patient's abdomen with an inert gas, usually carbon dioxide ($CO2$) which is supplied via needle injection.

BRIEF DESCRIPTION OF THE DRAWINGS

The present description will be understood more fully when viewed in conjunction with the accompanying drawings of various examples of medical devices for use in the creation of a temporary pneumoperitoneum. The description is not meant to limit the medical devices to the specific examples. Rather, the specific examples depicted and described are provided for explanation and understanding of medical devices for use in the creation of a temporary pneumoperitoneum. Throughout the description the drawings may be referred to as drawings, figures, and/or FIGS.

DETAILED DESCRIPTION

Medical devices for use in the creation of a temporary pneumoperitoneum, as disclosed herein, will become better understood through a review of the following detailed description in conjunction with the figures. The detailed description and figures provide merely examples of the various embodiments of medical devices for use in the creation of a temporary pneumoperitoneum. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

Conventional devices restrict the movement of a medical apparatus inserted through the device into the patient's abdomen and allow little or no room for positional adjustment of the medical apparatus. Secondly, some of the known devices have a relatively complex construction which increases the cost of manufacture. As these devices are intended to be disposable, a low manufacturing cost is essential. Thirdly, some conventional devices do not provide functionality to detect or otherwise handle situations in which abdominal wall adhesion or other unexpected tissue and/or organ interaction or structure is present. Additionally, the complexity of conventional devices increases the learning curve as well as a risk of user error or device failure.

Implementations of the medical devices for use in the creation of a temporary pneumoperitoneum, as disclosed herein, may address some or all of the problems described above. For example, embodiments disclosed herein allow for adjustment and manipulation of the medical device relative to the surgical site, detection of parameters at or near the surgical site, maneuvering of medical apparatuses within the medical device while in place at the surgical site, and vacuum control to maintain proper lifting and condition of the surgical site. Additionally, due to the relative lack of complexity of the medical device, embodiments described herein reduce cost, potential user error, and failure rate of the medical device itself.

Figure 1:
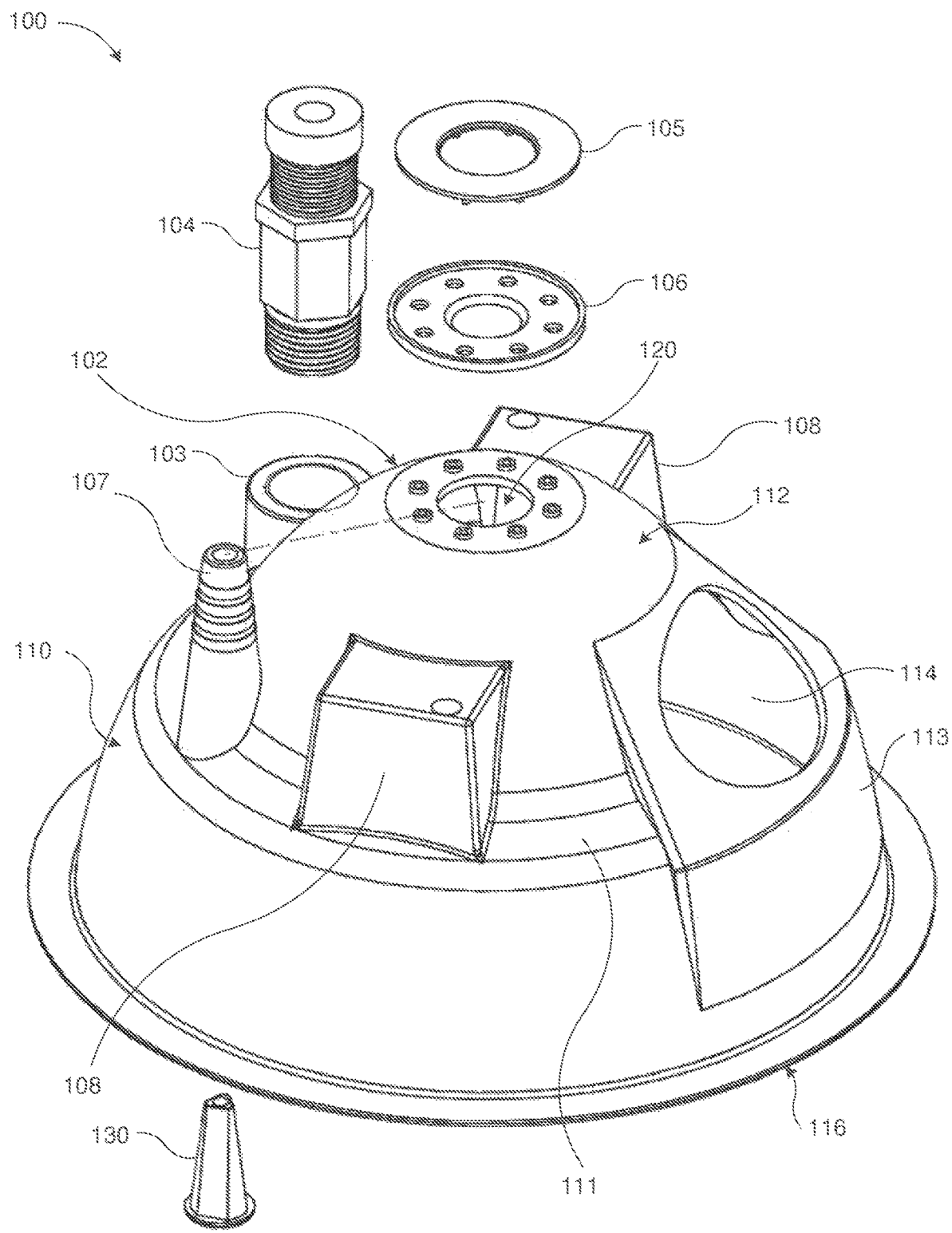
FIG. 1 illustrates an exploded view of a medical device for use in the creation of a temporary pneumoperitoneum, according to an embodiment.

FIG. 1 illustrates an exploded view of a medical device 100 for use in creating a temporary pneumoperitoneum, according to an embodiment. The use of the medical device 100 allows for creation of a temporary pneumoperitoneum to assist in preparation for and execution of surgery.

In some embodiments, the medical device 100 includes a rigid dome 102, a vacuum pressure regulator 104, a retention ring 105, a septum 106, a vacuum port 107, a vacuum control port 109, and a raised structure 108. The rigid dome 102 is an approximately substantially hemispherical or dome-shaped structure having a first dome stage 110 and a second dome stage 112. The first dome stage 110 and the second dome stage 112 together form the rigid dome 102. In other words, the first dome stage 110 forms a bottom portion of the rigid dome 102 and the second dome stage 112 forms an upper portion of the rigid dome 102. In some embodiments, the rigid dome 102 may be separable into a first hemisphere and a second hemisphere and/or leave a surgical device, such as a Veress needle or trocar, in-situ at the surgical site through removal of the rigid dome 102 as previously disclosed.

The first dome stage 110 and the second dome stage 112 may each form approximately round portions of the rigid dome 102. In some embodiments, one of the first dome stage 110 or the second dome stage 112 constitutes a greater diameter portion of the rigid dome 102 than the other. In some embodiments, at least one of the first dome stage 110 or the second dome stage 112 includes a viewing structure 113 and/or viewing window 114 which may be optically and/or acoustically transparent or semi-transparent to facilitate inspection of a surgical site on an interior of the rigid dome 102. At least one of an angle, radius of curvature, or size, or the like of the first dome stage 110 may be equivalent to a corresponding aspect of the second dome stage 112. In some embodiments, one or more aspects of the first dome stage 110 is different from a corresponding aspect of the second dome stage 112.

In some embodiments, the first dome stage 110 has a greater interior volume than the second dome stage 112. In some embodiments, the first dome stage 110 and the second dome stage 112 may have similar internal volumes with different geometries.

In some embodiments, the first dome stage 110 is joined to the second dome stage 112 at a transition 111. In some embodiments, the transition 111 forms a change in geometry or other aspect between the first dome stage 110 and the second dome stage 112. In some embodiments, the transition 111 may include structural reinforcement, different materials, or other functional or structural features. In some embodiments, the first dome stage 110 of the rigid dome 102 includes a patient interface 116.

In some embodiments, the patient interface 116 extends around a base of the first dome stage 110. The patient interface 116 may be rolled outward from the first dome stage 110 to provide an increased surface area relative to a thickness of the first dome stage 110. In some embodiments, the patient interface 116 extends around an entirety of the first dome stage 110. In other embodiments, the patient interface 116 may extend around only a portion of the first dome stage 110. The patient interface 116 may reduce a pressure at the surgical site around the rigid dome 102. The patient interface 116 may improve a vacuum seal at the surgical site to assist in the creation and maintenance of a pressure differential across the medical device 100. The patient interface 116 may reduce impact to the flow of blood or other fluids or reduce the risk of tissue damage. Additionally, the increased surface area at the patient interface 116 may reduce a risk of exacerbating a wound at the surgical site. In some embodiments, the patient interface 116 may include a coating, liner, treatment, or so forth to improve comfort, blood flow, sanitization, traction, vacuum seal, or so forth.

In some embodiments, an aperture 120 is formed in the second dome stage 112. In some embodiments, the aperture 120 is a circular opening in the rigid dome 102. In other embodiments, the aperture 120 has a non-circular geometry. In some embodiments, the aperture 120 is formed centrally on the rigid dome 102. In other embodiments, the aperture 120 is formed in an off-center location and may be formed in one or more of the first dome stage 110 and the second dome stage 112. The aperture 120 may include holes, ridges, depressions, rings, friction fittings, and so forth to improve a seal, retention, releasability, or other characteristics in relation to a septum 106. The second dome stage 112 of the rigid dome 102 may include an alignment feature to correspond with a geometry or feature of the septum 106 to facilitate alignment of the septum 106 within the aperture 120.

In some embodiments, the vacuum pressure regulator 104 is configured to control a vacuum pressure within the rigid dome 102. removably seal the first joining interface 122 of the first the vacuum pressure regulator 104 may provide a mechanical and/or electronic component. the vacuum pressure regulator 104 may be programmable to set an operating pressure or pressure range for the medical device 100. For example, the vacuum pressure regulator 104 may release air into the rigid dome 102 to maintain an operating pressure. The vacuum pressure regulator 104 may also be configured to relieve the vacuum in a controlled manner to facilitate relaxation of the surgical site and removal of the medical device 100. The vacuum pressure regulator 104 may be adjusted by interfacing directly with the vacuum pressure regulator 104 or may be controlled remotely. For example, the vacuum pressure regulator 104 may communicated, in a wired or wireless manner, with a controller.

In some embodiments, the vacuum pressure regulator 104 is configured to provide various vacuum pressures or set points. For example, the vacuum pressure regulator 104 may be configured with a first set point corresponding to a first vacuum pressure to engage the medical device 100 at a surgical site and provide a first level of lift of the surgical site, a second vacuum pressure to provide a second level of lift of the surgical site, a third vacuum pressure to provide a third level of lift of the surgical site for inspection and surgical operation, and a fourth vacuum pressure for relaxation of the surgical site and release of the device 100 from the surgical site. In some embodiments, fewer or more set points may be used. In some embodiments, a titrated approach may allow for settling of components of the surgical site to reduce a chance of drawing organs or other components upward into the rigid dome 102 in an undesired manner.

In some embodiments, the medical device 100 also includes a septum 106. The septum 106 may be positioned within the aperture 120 and form a permeable barrier to allow a medical apparatus to penetrate through the septum 106 to access the interior of the rigid dome 102. The septum 106 may be configured to interface with the retention ring 105 to secure the septum 106 relative to the rigid dome 102. In some embodiments, the retention ring 105 and\or septum 106 may be tearable or otherwise separable to release from a surgical device to leave the surgical device in-situ. In some embodiments, the septum 106 is formed from a different material than the rigid dome 102. The use of a different material may allow for easier puncture of the septum 106 relative to the rigid dome 102, thereby facilitating insertion of the medical apparatus through the septum 106.

The medical device 100 may also include a vacuum port 107. In some embodiments, the vacuum port 107 is disposed in the rigid dome 102 between the patient interface 116 and the aperture 120. In some embodiments, the vacuum port 107 forms a fluid pathway between an interior of the rigid dome 102 and an exterior of the rigid dome 102. In some embodiments, the vacuum port 107 facilitates connection of a vacuum source to the rigid dome 102 to reduce a pressure on the interior of the rigid dome 102. In some embodiments, the vacuum port 107 projects outward from the rigid dome 102 in a vertical or angled orientation. The vacuum port 107 may be smooth, threaded, barbed, or so forth, to accept a connection to the vacuum source.

Some embodiments include a vacuum bypass 130. The vacuum bypass 130 may be compatible with the vacuum port 107 to form a barrier at the vacuum port 107 to maintain a reduced pressure on the interior of the rigid dome 102 and prevent blockage of the vacuum port 107 by tissue drawn up into the rigid dome 102. In some embodiments, the vacuum bypass 130 may be incorporated into the vacuum port 107 to create a one-way valve allowing air to be evacuated from the interior of the rigid dome 102 while resisting the flow of air back into the interior of the rigid dome 102. In some embodiments, the vacuum bypass 130 is actuated by an input on the exterior of the rigid dome 102 to equalize the pressure on the interior of the rigid dome 102 to an exterior pressure.

The medical device 100 may include a regulator port 103. The regulator port 103 may be configured to provide pressure communication to the interior of the rigid dome 102. The regulator port 103 may accept the vacuum pressure regulator 104 to allow the vacuum pressure regulator 104 to regulate a pressure within the rigid dome 102. The vacuum pressure regulator 104 may couple to the regulator port 103 through threads, clips, friction fitment, or so forth.

The medical device 100 may also include a raised structure 108 extending outward from an exterior surface of the rigid dome 102 to form a physical interface to receive a force to physically manipulate the rigid dome 102. For example, a user may grasp the medical device 100 at the raised structure 108 to position the medical device 100 relative to the surgical site, orient the medical device 100 relative to the user or the surgical site, apply a force into or away from a plane of the surgical site, separate the first dome stage 110 from the second dome stage 112, or so forth. In some embodiments, the raised structure 108 includes grip elements. For example, the raised structure 108 may include ridges, knurling, dimples, coatings, or so forth to increase a friction coefficient of at least a portion of the raised structure 108.

In some embodiments, the medical device 100 includes a viewing structure 113 and a viewing window 114. In some embodiments, the viewing structure 113 and the viewing window 114 are distinct. In other embodiments, the viewing structure 113 forms a distinct structure at least partially surrounding the viewing window 114. In some embodiments, at least one of the viewing structure 113 or the viewing window 114 is optically and\or acoustically transparent. In some embodiments, the viewing structure 113 and\or the viewing window 114 allows for visual and\or ultrasound or other acoustic inspection to inspect the surgical site during vacuum draw and or surgical operation.

In some embodiments, abdominal wall adhesion and\other conditions may present increased risk for a surgical procedure. Allowing for visual and\or acoustical inspection via the viewing structure 113 and\or the viewing window 114 may reduce the risk of perforation of biological structures that may be drawn into the medical device 100.

Figure 2:
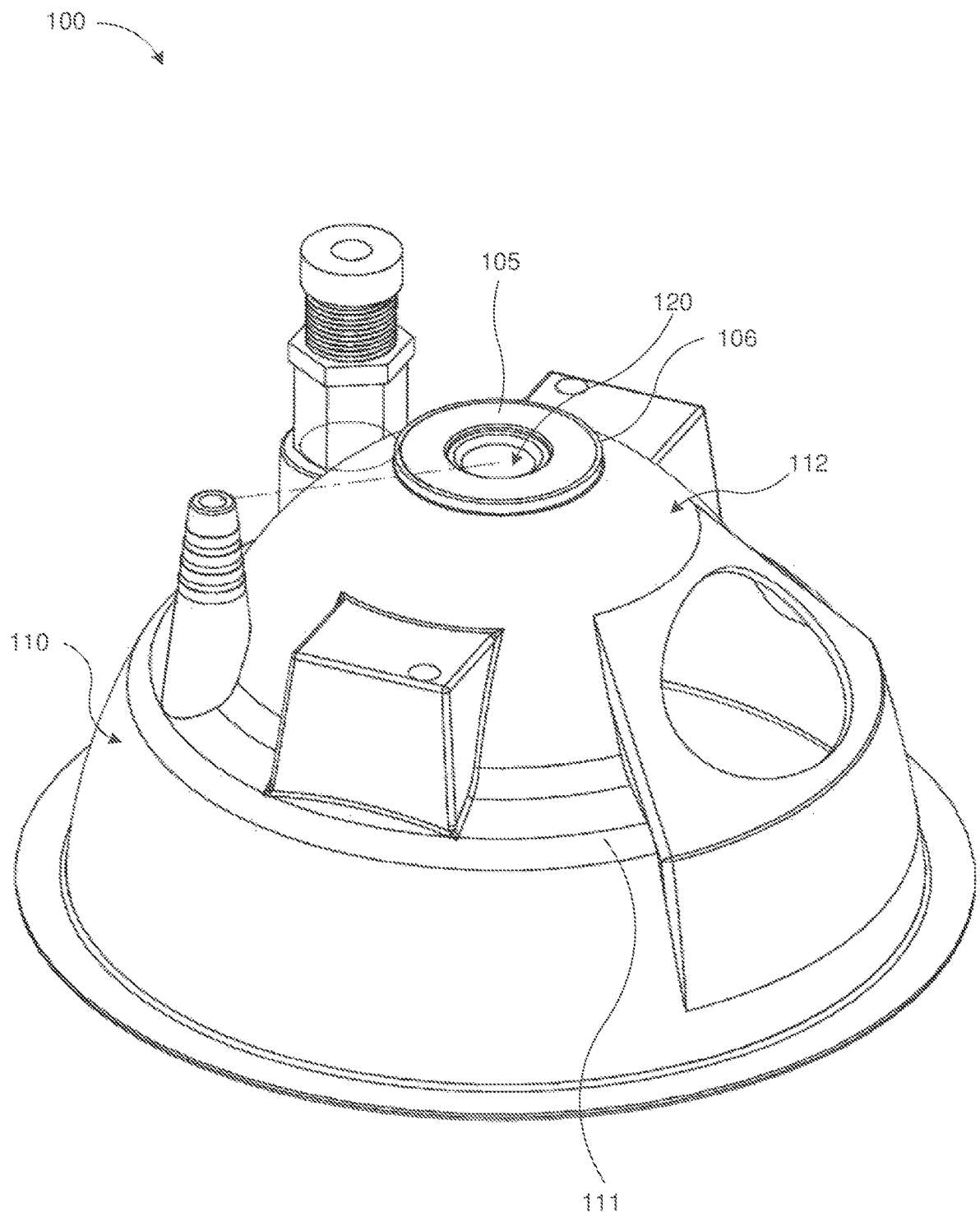
FIG. 2 illustrates an assembled view of the medical device of FIG. 1, according to an embodiment.

FIG. 2. illustrates an assembled view of the medical device 100 of FIG. 1, according to an embodiment. Some embodiments forms a complete air-tight or near air-tight dome to cover and manipulate a surgical site to reduce risk of unintended harm during a surgical operation or in preparation for a surgical operation. In some embodiments, the first dome stage 110 is formed with the second dome stage 112 to create a transition 111 to reduce unintended lift of biological structures into the medical device 100.

In some embodiments, the septum 106 is sealed in the aperture 120 of the rigid dome 102. In some embodiments, the septum 106 is sealed within the aperture 120 using an adhesive, welding, mechanical fitment, or so forth. In other embodiments, a structure of the septum 106 is sufficient to maintain a seal relative to the aperture 120.

Figure 3:
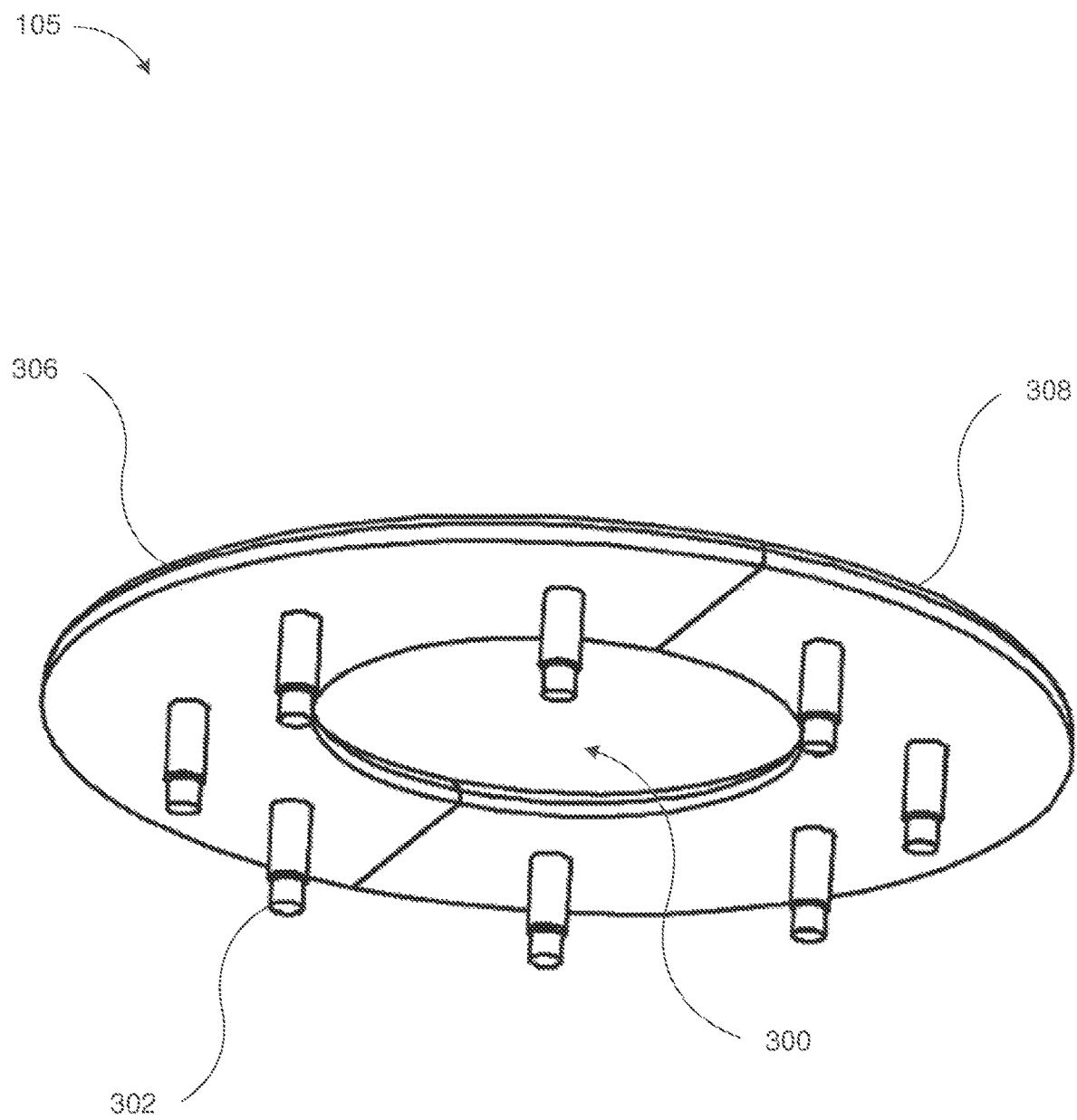
FIG. 3 illustrates a perspective view of a retention ring of the medical device of FIG. 1, according to an embodiment.

FIG. 3 illustrates a perspective view of a retention ring 105 of the medical device of FIG. 1, according to an embodiment. Some embodiments of the retention ring 105 allow for increased security and seal of the septum 106 relative to the rigid dome 102. In some embodiments, the retention ring 105 may also allow for removal from a medical instrument while the instrument remains in-situ. The retention ring 105 may be separable into a first ring portion 306 and a second ring portion 308. The retention ring 105 may be separated into the first ring portion 306 and the second ring portion 308 or may facilitate user input to separate the retention ring 105. The retention ring 105 may include a central aperture 300. The central aperture 1500 may be positioned in the retention ring 105 to allow access to the septum 106 for insertion of a medical instrument through the septum 106.

In some embodiments, the retention ring 105 includes posts 302 extending perpendicular from a plane of the retention ring 105. In some embodiments, the posts 302 are arranged in a pattern around the retention ring 105. In some embodiments, the posts 302 are distributed evenly around the retention ring 105. In some embodiments, the posts 302 retain the septum 106 to facilitate splitting of the septum 106 in response to separation of the first dome stage 110 and the second dome stage 112.

In some embodiments, the posts 302 may have a consistent cross-sectional geometry. In other embodiments, the posts 302 have a differential geometry. For example, in some embodiments, the posts 302 have a tip section with a smaller diameter. This variation in geometry may allow the posts 302 to engage separately with the septum 106 and the rigid dome 102.

Figure 4:
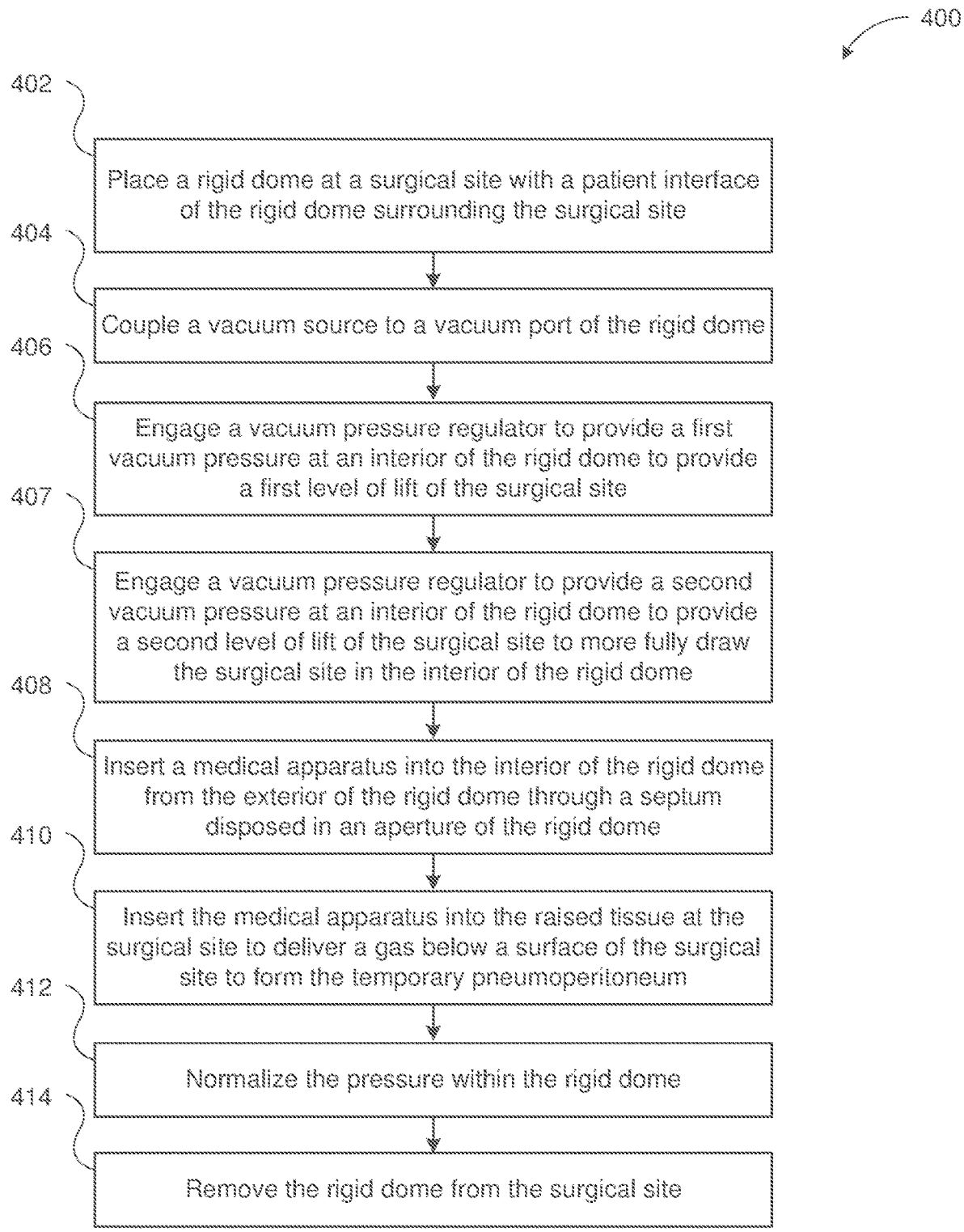
FIG. 4 illustrates a flow diagram of a method for using the medical device of FIG. 1, according to another embodiment.

FIG. 4 illustrates a flow diagram of a method 400 for using the medical device 100 of FIG. 1, according to another embodiment. The method 400 allows for creation of a temporary pneumoperitoneum for surgery. The method 400 may include placing a rigid dome at a surgical site with a patient interface of the rigid dome surrounding the surgical site. For example, the rigid dome 102 may be placed at a surgical site with the patient interface 116 of the rigid dome 102 positioned to surround the surgical site (Block 402).

The method 400 may include coupling a vacuum source to a vacuum port of the rigid dome Block 404). For example, a vacuum source may be coupled to the vacuum port 107 of the rigid dome 102 to supply a reduced pressure to the rigid dome 102. The method 400 may include engaging a vacuum pressure regulator to provide a first vacuum pressure at an interior of the rigid dome to provide a first level of lit of the surgical site (Block 406). For example, a first set point may be engaged at the vacuum pressure regulator 104 to begin to lift the surgical site into the rigid dome 102. The method 400 may include engaging a vacuum pressure regulator to provide a second vacuum pressure at an interior of the rigid dome to provide a second level of lift of the surgical site to draw the surgical site more fully into the interior of the rigid dome (Block 407). For example, a second set point on the vacuum pressure regulator 104 may increase the vacuum to further draw the surgical site into position to facilitate inspection or performing of a surgical operation.

The method 400 may include inserting a medical apparatus into the interior of the rigid dome from the exterior of the rigid dome through a septum disposed in an aperture of the rigid dome (Block 408). For example, the medical apparatus 602 may be inserted through the septum 106 of the rigid dome 102 to access an interior of the rigid dome 102. The method 400 may include inserting the medical apparatus into the raised tissue at the surgical site to deliver a gas below a surface of the surgical site to form the temporary pneumoperitoneum (Block 410). For example, the medical apparatus 602 may be introduced into the surgical site, which is distended into the rigid dome 102, to deliver an inert gas (e.g., $CO_2$) below a surface layer of the surgical site to create a temporary pneumoperitoneum at the surgical site to facilitate laparoscopic surgery or another surgical operation.

The method 400 may include normalizing the pressure within the rigid dome (Block 412). For example, the pressure within the rigid dome 102 may be normalized or equalized by disengaging a vacuum source from the vacuum port 107, manipulating a vacuum bypass 130, engaging a vacuum pressure regulator, lifting the rigid dome 102 from the surgical site, engaging the vacuum pressure regulator 104, or so forth. The method 400 may include removing the rigid dome from the surgical site (Block 414). In some embodiments, the rigid dome 102 may be separated or otherwise disassembled to leave the medical apparatus indwelling at the surgical site A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e., methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively inclusive elements includes at least one element of the listed elements. However, an example described using a list of alternatively inclusive elements does not preclude another example that includes all of the listed elements. And an example described using a list of alternatively inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower, or equal in scope to the original claims, are to be considered within the subject matter of the examples described herein.

The invention claimed is:

1. A medical device, comprising:
    a rigid dome having a substantially hemispherical geometry configured to interface at a surgical site, the rigid dome comprising:
        a first dome stage proximate the surgical site;
        a second dome stage distal from the surgical site and having a reduced geometry relative to the first dome stage; and
        a transition formed between the first dome stage and the second dome stage having a geometry transitioning between a geometry of the first dome stage and the reduced geometry of the second dome stage;
    a viewing window formed in the rigid dome and configured to be acoustically and/or optically transparent to allow for inspection of the surgical site;
    a vacuum port coupled to the rigid dome to provide fluid communication with an interior of the rigid dome to allow for a reduction of a pressure on the interior of the rigid dome;
    a vacuum pressure regulator coupled to the rigid dome to regulate the pressure on the interior of the rigid dome;
    an aperture formed in the second dome stage to provide access to the interior of the rigid dome and the surgical site;
    a septum positioned at the aperture and configured to engage with the second dome stage to allow for insertion of a surgical instrument with resistance to loss of the pressure on the interior of the rigid dome;
    a vacuum bypass compatible with the vacuum port to form a barrier at the vacuum port to resist plugging of the vacuum port by the surgical site, wherein the vacuum bypass is disposed within the vacuum port and interacts with the surgical site at the vacuum port to maintain fluid flow from the rigid dome and through the vacuum port without occupying space within the rigid dome; and
    a regulator port formed in the rigid dome separate from the vacuum port, wherein the regulator port is configured to accept the vacuum pressure regulator.

2. The medical device of claim 1, further comprising a retention ring to apply a retaining force to the septum at the aperture.

3. The medical device of claim 2, wherein the septum is configured to provide a permeable barrier in the aperture to allow a medical apparatus to penetrate through the septum to access the interior of the rigid dome.

4. The medical device of claim 2, wherein the retention ring comprises posts configured to pass through the septum and secure the septum and retaining ring relative to the rigid dome.

5. A method, comprising:
    placing a rigid dome at a surgical site with a patient interface of the rigid dome surrounding the surgical site;
    coupling a vacuum source to a vacuum port of the rigid dome;
    engaging a vacuum pressure regulator to provide a first vacuum pressure at an interior of the rigid dome to provide a first level of lift of the surgical site within the interior of the rigid dome;
    engaging the vacuum pressure regulator to provide a second vacuum pressure at the interior of the rigid dome to provide a second level of lift of the surgical site to draw the surgical site more fully into the interior of the rigid dome;
    inserting a medical apparatus into the interior of the rigid dome from an exterior of the rigid dome through a septum disposed in an aperture of the rigid dome;
    inserting the medical apparatus into the surgical site to deliver a gas below a surface of the surgical site to form a temporary pneumoperitoneum;
    normalizing pressure within the rigid dome;
    removing the rigid dome from the surgical site;
    forming, by a vacuum bypass compatible with the vacuum port, a barrier at the vacuum port to resist plugging of the vacuum port by the surgical site, wherein the vacuum bypass is disposed within the vacuum port and interacts with the surgical site at the vacuum port to maintain fluid flow from the rigid dome and through the vacuum port without occupying space within the rigid dome; and
    accepting, by a regulator port formed in the rigid dome separate from the vacuum port, the vacuum pressure regulator.

6. The method of claim 5, further comprising maintaining the second level of lift of the surgical site during a surgical operation via application of vacuum pressure by the vacuum source and regulation of vacuum pressure by the vacuum pressure regulator.

7. The method of claim 5, further comprising inspecting the surgical site via a viewing window disposed in the rigid dome, wherein the viewing window is transparent relative to another portion of the rigid dome.

8. The method of claim 7, wherein inspecting the surgical site comprises optically inspecting the surgical site via the viewing window, wherein the viewing window is optically transparent.

9. The method of claim 7, wherein inspecting the surgical site comprises acoustically inspecting the surgical site via the viewing window, wherein the viewing window is acoustically transparent.

10. The method of claim 5, further comprising reducing plugging of the vacuum port by reducing surgical site interaction at the vacuum port of the rigid dome by reducing a likelihood of the surgical site blocking the vacuum port.

11. The method of claim 5, further comprising manipulating the rigid dome relative to the surgical site through an application of force at a raised structure extending from an exterior surface of the rigid dome.

12. A system, comprising:
a medical apparatus configured to be inserted at a surgical site;
a rigid dome configured to admit the medical apparatus through a septum into an interior of the rigid dome to allow the medical apparatus to be inserted at the surgical site, wherein the rigid dome comprises:
  a viewing window disposed in the rigid dome, wherein the viewing window is optically and/or acoustically transparent; and
a vacuum source configured to connect to a vacuum port of the rigid dome to reduce a pressure within the rigid dome and lift the surgical site into the interior of the rigid dome for insertion of the medical apparatus at the surgical site;
a vacuum bypass compatible with the vacuum port to form a barrier at the vacuum port to resist plugging of the vacuum port by the surgical site, wherein the vacuum bypass is disposed within the vacuum port and interacts with the surgical site at the vacuum port to maintain fluid flow from the rigid dome and through the vacuum port without occupying space within the rigid dome; and
a regulator port formed in the rigid dome separate from the vacuum port, wherein the regulator port is configured to accept a vacuum pressure regulator coupled to the rigid dome.

13. The system of claim 12, wherein the medical apparatus comprises a trocar for a laparoscopic surgical operation, wherein an aperture is positioned in the rigid dome to allow the trocar to pass through the aperture and access the surgical site within the rigid dome while resisting loss of the pressure within the rigid dome.

14. The system of claim 12, wherein the vacuum pressure regular is configured to regulate a pressure within an interior of the rigid dome.

15. The system of claim 12, wherein a material of the septum is different from a material of the rigid dome to allow for penetration of a medical apparatus into an interior of the rigid dome.

16. The system of claim 12, wherein the rigid dome comprises a first dome stage and a second dome stage wherein the first dome stage is positioned to be proximate the surgical site and have a first geometry and the second dome stage is positioned proximate the first dome stage to be opposite the surgical site and have a reduced geometry relative to the first dome stage.

17. The system of claim 12, wherein the viewing window is acoustically transparent to allow for ultrasound inspection of the surgical site.

* * * * *